US012421984B1

(12) United States Patent
Xu

(10) Patent No.: US 12,421,984 B1
(45) Date of Patent: Sep. 23, 2025

(54) MOUNTING STRUCTURE FOR A FAN LAMP

(71) Applicant: Zhuoyong Xu, Zhongshan (CN)

(72) Inventor: Zhuoyong Xu, Zhongshan (CN)

(73) Assignee: Zhuoyong Xu, Zhongshan (CN)

( * ) Notice: Subject to any disclaimer, the term of this patent is extended or adjusted under 35 U.S.C. 154(b) by 0 days.

(21) Appl. No.: 19/194,776

(22) Filed: Apr. 30, 2025

(30) Foreign Application Priority Data

Aug. 20, 2024 (CN) ......................... 202422015970.0

(51) Int. Cl.
*F04D 25/08* (2006.01)
*F04D 19/00* (2006.01)
*F04D 29/64* (2006.01)
*F21V 33/00* (2006.01)

(52) U.S. Cl.
CPC ......... *F04D 29/646* (2013.01); *F04D 19/002* (2013.01); *F04D 25/088* (2013.01); *F21V 33/0096* (2013.01)

(58) Field of Classification Search
CPC ...... F04D 29/646; F04D 19/002; F04D 25/08; F04D 25/088; F04D 29/329; F04D 29/384; F04D 29/388; F04D 29/703; F21S 8/04; F21S 8/043; F21S 8/046; F21S 8/06; F21S 8/061; F21S 8/063; F21S 8/065; F21V 33/0096
See application file for complete search history.

(56) References Cited

U.S. PATENT DOCUMENTS 785,004 A * 3/1905 Klemm et al. ........... H02K 5/00 310/91
1,222,837 A * 4/1917 Winslow et al. ..... F21V 21/002 310/68 R
1,506,522 A * 8/1924 Gansel .................. F04D 25/088 416/170 R
2,434,130 A * 1/1948 Turner .................. F04D 29/646 416/246
D283,156 S * 3/1986 Mandelli ........................ D26/26
4,882,467 A * 11/1989 Dimick .................... A47G 1/02 34/523
7,862,371 B1 * 1/2011 Johnson ................. H01R 33/92 362/147
9,175,697 B1 * 11/2015 Kadau ................... F04D 29/601
D1,021,054 S * 4/2024 Tang ............................ D23/385
D1,037,519 S * 7/2024 Yang .............................. D26/59
D1,040,330 S * 8/2024 Li ................................ D23/377
D1,045,166 S * 10/2024 Huang ........................... D26/59
D1,050,397 S * 11/2024 Luo .............................. D23/377
D1,050,400 S * 11/2024 Chen ............................ D23/377
D1,050,517 S * 11/2024 Liang ............................. D26/59
(Continued)

*Primary Examiner* — Aaron R Eastman
(74) *Attorney, Agent, or Firm* — NZ Carr Law Office

(57) ABSTRACT

The present application discloses a mounting structure for a fan lamp, comprising an installation base and a mounting component fixed to a fan lamp body. The mounting component includes a mounting ring, a hollow mounting column, and a lamp head. The bottom end of the hollow mounting column is fixed to the top of the mounting ring, and the mounting ring is secured to the top surface of the fan lamp body via screws. A limit stop collar is disposed on the middle portion of the outer wall of the hollow mounting column, and an external thread is provided on the upper portion of the outer wall of the hollow mounting column.

4 Claims, 4 Drawing Sheets

(56) References Cited

U.S. PATENT DOCUMENTS

D1,050,518 S * 11/2024 Wei .................................. D26/59
D1,061,850 S * 2/2025 Xu .................................. D26/59
D1,061,978 S * 2/2025 Wei .................................. D23/385
D1,071,281 S * 4/2025 Deng .................................. D26/59
D1,073,146 S * 4/2025 Huang .................................. D26/59

* cited by examiner

MOUNTING STRUCTURE FOR A FAN LAMP

FIELD OF THE INVENTION

The present application pertains to the technical field of fan lamps, and specifically relates to a mounting structure for a fan lamp.

BACKGROUND

A fan lamp is a common indoor lighting and ventilation structure, typically comprising an installation base, a mounting hanger rod, and a fan lamp body. The installation base and the mounting hanger rod together form a complete mounting structure. In prior art, the mounting hanger rod is connected to the installation base via threaded rods. While this configuration meets general usage requirements, disassembly and assembly are relatively inconvenient. Additionally, over prolonged use, loosening or detachment may occur, compromising operational stability and safety. Consequently, applicability and practicality are limited.

SUMMARY

The objective of the present utility model is to provide a mounting structure for a fan lamp with a rational structural configuration that enhances operational stability.

The technical solution for achieving this objective is a mounting structure for a fan lamp, comprising an installation base and a mounting component fixed to a fan lamp body, wherein the mounting component is connected to the installation base. The mounting component includes a mounting ring, a hollow mounting column, and a lamp head.

A bottom end of the hollow mounting column is fixed to a top of the mounting ring, and the mounting ring is secured to a top surface of the fan lamp body via screws.

A limit stop collar is disposed on a middle portion of an outer wall of the hollow mounting column, and an external thread is provided on an upper portion of the outer wall of the hollow mounting column. A protrusion is formed at a top end of the hollow mounting column, and an external thread pattern is provided on an outer wall of the protrusion.

The lamp head is fixed to the protrusion via the external thread pattern.

An internal threaded boss is integrally formed at a center of a bottom end of the installation base.

An upper portion of the hollow mounting column is threadedly connected and fixed within the internal threaded boss.

Further preferably:

- a top surface of the limit stop collar is integrally formed with at least one limit lug;
- a bottom surface of the internal threaded boss is uniformly provided with limiting tooth slots;
- an upper portion of the hollow mounting column is threadedly connected to the internal threaded boss, and the limit lug snaps into one of the limiting tooth slots to achieve positional locking.

Further preferably:

- a height of the limit lug corresponds to a depth of the limiting tooth slots.

Further preferably:

- an outer wall of the internal threaded boss is provided with a plurality of parallel anti-slip ribs.

Further preferably:

- a conductive contact tab is fixed to a top of the internal threaded boss;

- when the hollow mounting column is threadedly connected to the internal threaded boss, the lamp head presses against the conductive contact tab to establish an electrical connection.

The present utility model delivers advantageous effects as follows: The structural configuration of the utility model is rational, incorporating a limit stop collar coordinated with the hollow mounting column and protrusion, which facilitates rapid connection between the lamp head and the internal threaded boss on the installation base. This enhances installation convenience and simplifies disassembly, maintenance, and repair operations. Concurrently, the hollow mounting column effectively provides buffering performance, thereby improving operational stability.

Additionally, the limit stop collar is provided with at least one limit lug on its top surface, which cooperates with limiting tooth slots uniformly disposed on the bottom surface of the internal threaded boss. Upon assembly, the limit lug snaps into one of the limiting tooth slots, effectively preventing loosening or detachment during use. This design significantly improves operational stability and safety, ensuring excellent applicability and practicality.

BRIEF DESCRIPTION OF THE DRAWINGS

To facilitate a clearer understanding of the content of the present utility model, the utility model is described in further detail below with reference to specific embodiments and the accompanying drawings, wherein:

As shown in FIGS. 1-4:

Installation Base 1
Fan Lamp Body 2
Mounting Component 3
Mounting Ring 31
Hollow Mounting Column 32
Lamp Head 33
Limit Stop Collar 4
External Thread 5
Protrusion 6
External Thread Pattern 7
Internal Threaded Boss 8
Limit Lug 9
Tooth Slot 10
Anti-Slip Rib 11

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 1:
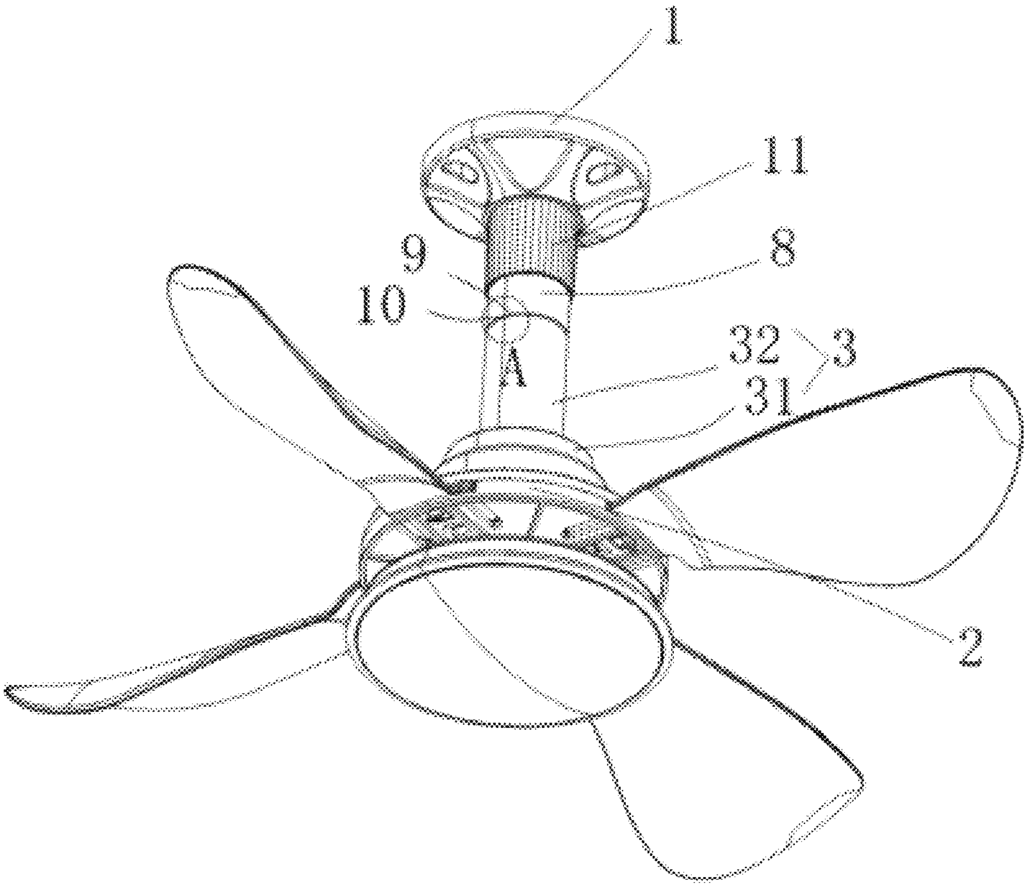
FIG. 1 is a schematic structural diagram of the utility model.
Figure 2:
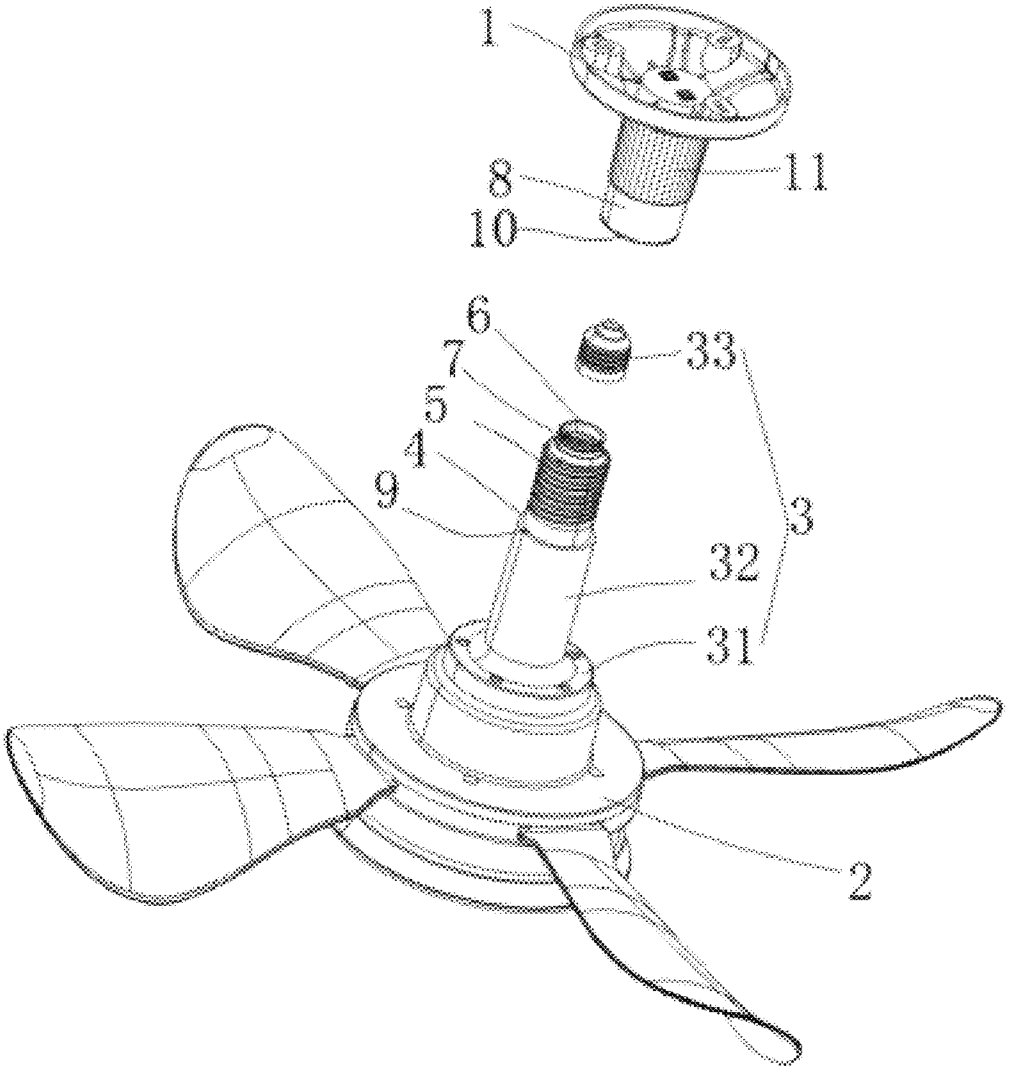
FIG. 2 is an exploded structural diagram of the utility model.
Figure 3:
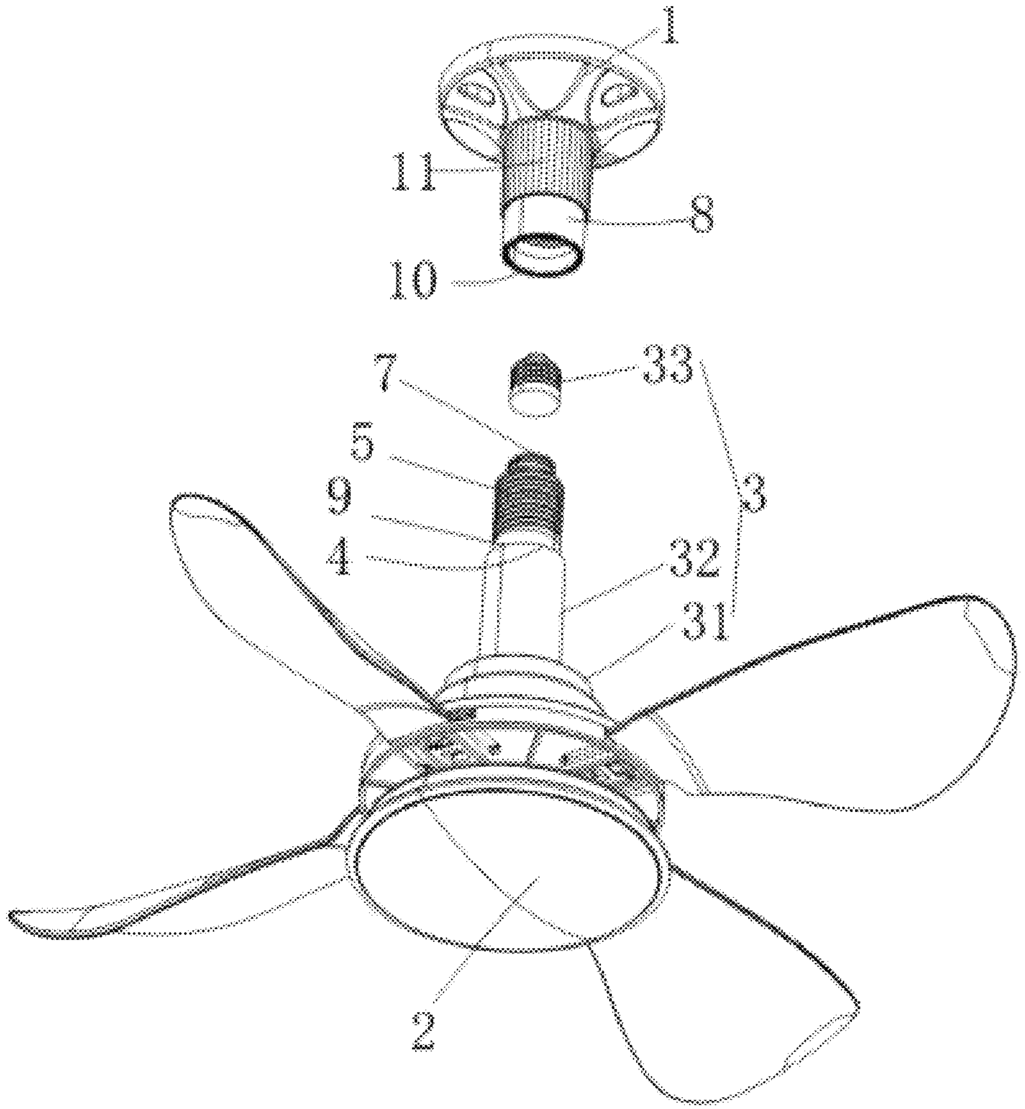
FIG. 3 is a structural diagram of the exploded components from another perspective.
Figure 4:
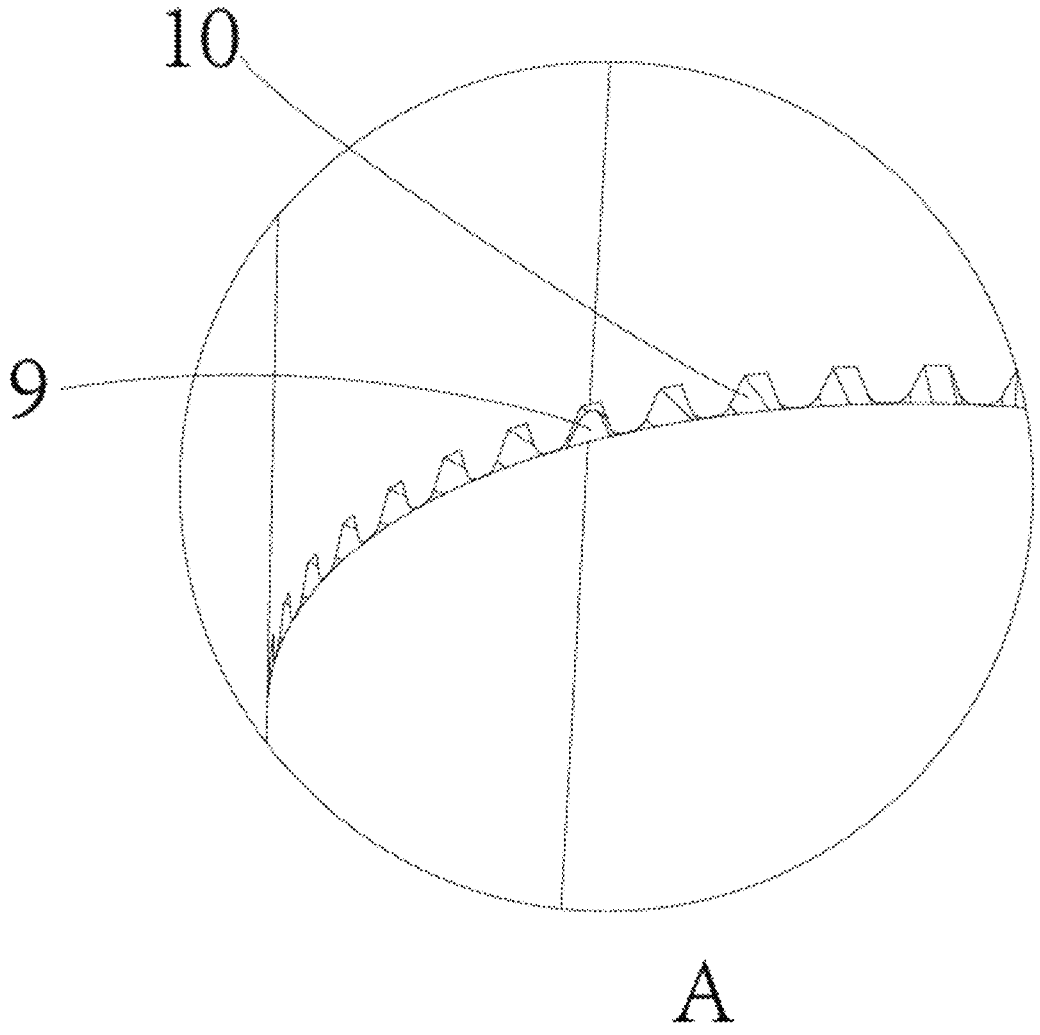
FIG. 4 is an enlarged schematic structural diagram of area A in FIG. 1.

As shown in FIGS. 1 to 4, a mounting structure for a fan lamp includes an installation base 1 and a mounting component 3 fixed to a fan lamp body 2. The mounting component is connected to the installation base. In this embodiment, the fan lamp body adopts a conventional prior-art structure for straightforward application, and the mounting component is secured to the fan lamp body via screws.

In practical application, the mounting component 3 comprises a mounting ring 31, a hollow mounting column 32, and a lamp head 33. The hollow mounting column provides buffering performance during high-speed rotation of the fan, thereby enhancing operational stability. During assembly, a bottom end of the hollow mounting column is fixed to a top of the mounting ring, and the mounting ring is secured to a top surface of the fan lamp body via screws.

Furthermore, in practical application, a limit stop collar 4 is disposed on a middle portion of an outer wall of the hollow mounting column, an external thread 5 is provided on an upper portion of the outer wall of the hollow mounting column, and a protrusion 6 is formed at a top end of the hollow mounting column. An external thread pattern 7 is provided on an outer wall of the protrusion. During assembly, the lamp head is fixed to the protrusion via the external thread pattern. An internal threaded boss 8 is integrally formed at a center of a bottom end of the installation base. An upper portion of the hollow mounting column is threadedly connected and fixed within the internal threaded boss. Through the above structure, the installation convenience between the installation base and the hollow mounting column is improved, while the connection stability and ease between the lamp head and the protrusion are also enhanced.

To enhance operational stability, at least one limit lug 9 is integrally formed on a top surface of the limit stop collar. A bottom surface of the internal threaded boss is uniformly provided with limiting tooth slots 10. During assembly, an upper portion of the hollow mounting column is threadedly connected to the internal threaded boss, and the limit lug snaps into one of the limiting tooth slots to achieve positional locking. These dual structures enable positional locking, effectively preventing loosening or detachment during high-speed fan rotation, thereby improving operational stability and safety, with expanded applicability and enhanced practicality.

In practical application, a height of the limit lug corresponds to a depth of the limiting tooth slots. This dimensional compatibility ensures unimpeded assembly and disassembly while maintaining secure engagement.

Additionally, to facilitate threaded connection operations, a plurality of parallel anti-slip ribs 11 are provided on an outer wall of the internal threaded boss. The anti-slip ribs simplify handling during threading and ensure stable engagement of the threaded connection.

In practical application, a conductive contact tab is fixed to a top of the internal threaded boss. During assembly, when the hollow mounting column is threadedly connected to the internal threaded boss, the lamp head presses against the conductive contact tab to establish an electrical connection, ensuring reliable electrical continuity.

Advantageous Effects of the Utility Model:

The structural configuration of the present utility model is rational. The limit stop collar, in coordination with the hollow mounting column and protrusion, facilitates rapid connection between the lamp head and the internal threaded boss on the installation base. This design enhances installation convenience, simplifies disassembly and maintenance operations, and leverages the buffering performance of the hollow mounting column to improve operational stability.

Furthermore, the limit stop collar is provided with at least one limit lug on its top surface, which cooperates with limiting tooth slots uniformly disposed on the bottom surface of the internal threaded boss. Upon assembly, the limit lug snaps into one of the limiting tooth slots, effectively preventing loosening or detachment during operation. This significantly enhances operational stability and safety, ensuring broad applicability and superior practicality.

Standard components used in this embodiment may be procured directly from commercial sources. Non-standard structural parts described in the specification can be manufactured without ambiguity based on existing technical knowledge. All connections between components employ mature conventional methods from the prior art, and mechanical parts/equipment utilize standard models widely known in the field. Detailed descriptions of these conventional elements are thus omitted herein.

The above embodiments of the present utility model are provided solely to clearly illustrate the principles and applications of the invention, and shall not be construed as limiting its scope of implementation. Skilled artisans in the relevant field may modify or adapt the design in various forms based on the teachings herein. It is neither necessary nor feasible to exhaustively enumerate all embodiments. Any obvious variations or modifications derived from the substantive spirit of the present utility model shall remain within the scope of its protection.

The invention claimed is:

1. A mounting structure for a fan lamp, comprising:

an installation base and a mounting component fixed to a fan lamp body, wherein the mounting component is connected to the installation base, and is characterized in that:

the mounting component includes a mounting ring, a hollow mounting column, and a lamp head;

a bottom end of the hollow mounting column is fixed to a top of the mounting ring, and the mounting ring is secured to a top surface of the fan lamp body via screws;

a limit stop collar is disposed on a middle portion of an outer wall of the hollow mounting column, and an external thread is provided on an upper portion of the outer wall of the hollow mounting column;

a protrusion is formed at a top end of the hollow mounting column, and an external thread pattern is provided on an outer wall of the protrusion;

the lamp head is fixed to the protrusion via the external thread pattern;

an internal threaded boss is integrally formed at a center of a bottom end of the installation base; and an upper portion of the hollow mounting column is threadedly connected and fixed within the internal threaded boss.

2. The mounting structure for the fan lamp of claim 1, wherein a top surface of the limit stop collar is integrally formed with at least one limit lug;

a bottom surface of the internal threaded boss is uniformly provided with limiting tooth slots; and the upper portion of the hollow mounting column is threadedly connected to the internal threaded boss, and the limit lug snaps into one of the limiting tooth slots to achieve positional locking.

3. The mounting structure for the fan lamp of claim 2, wherein a height of the limit lug corresponds to a depth of the limiting tooth slots.

4. The mounting structure for the fan lamp of claim 1, wherein an outer wall of the internal threaded boss is provided with a plurality of parallel anti-slip ribs.

* * * * *